Patented May 30, 1933

1,911,273

UNITED STATES PATENT OFFICE

CHARLES W. GIRVIN, OF LONG BEACH, CALIFORNIA, ASSIGNOR, BY DIRECT AND MESNE ASSIGNMENTS, TO DEEPWATER CHEMICAL CO. LTD., OF COMPTON, CALIFORNIA, A CORPORATION OF CALIFORNIA

RECOVERY OF SILVER IODIDE

No Drawing.   Application filed June 28, 1930. Serial No. 464,715.

This invention relates to the recovery of silver iodide from brines containing small quantities of soluble iodides, such as natural brines, oil field waste water, or mother liquor remaining after recovery of nitrates from natural deposits and in which the iodates have been converted to iodides by use of a suitable reducing agent; and the invention consists in converting the soluble iodides to silver iodide, which is so very slightly soluble in brine as to be insoluble for practical purposes but which will remain finely suspended in the brine, and then forcing coagulation and rapid settling of the silver iodide whereby the supernatant brine may be removed by decantation and the settled silver iodide may thus be flushed out of the bottom of the container and then decomposed in any usual manner for separating the iodine and the silver.

More particularly it is an object of the invention to treat the brine which contains the finely suspended silver iodide, with a substance which will form a precipitate adapted to coagulate and carry down the silver iodide so that within a reasonable time the silver iodide settles in a fairly compact mass for ready decantation of the supernatant brine, and for this purpose I employ a colloidal substance with great adsorptive power and adapted to form a gelatinous precipitate which will cause the fine particles of silver iodide to collect into larger ones which will thus settle comparatively rapidly in the brine.

It is a further object of the invention to readily form and settle the gelatinous colloidal substance in the brine, and for this purpose I employ as such coagulating medium the hydroxide of a metal, such as aluminum or iron which has relatively weak electro-positive properties and is thus adapted for ready precipitation of its hydroxide by the action of an alkali on a solution of a salt of the metal, the necessary reaction being readily obtained by adding to the brine a neutral solution of a salt of the metal so that the brine, which in the case of oil field waste waters is always more or less alkaline, supplies the necessary alkali for hydrolyzing the salt and precipitating its hydroxide, or if the brine is not sufficiently alkaline, the same reaction is as readily obtained by adding a suitable alkaline solution to the brine.

The silver iodide which is to be recovered may be formed in a brine by conversion of soluble iodides of the brine to insoluble silver iodide. Thus for example oil field waste water from which it may be desired to recover iodine, contains relatively large quantities of chlorides and relatively small quantities of soluble iodides such as alkali metal iodides; these soluble iodides may be readily converted to insoluble silver iodide by treating the brine with silver chloride which is adapted for diffusion so as to reach each of the scattered molecules of the soluble iodides, and which will react therewith to convert the soluble iodides to insoluble silver iodide, which however will remain finely suspended in brine.

In practice I add substantially the theoretical quantity of silver, either in the form of silver nitrate or directly as silver chloride, to convert all of the soluble iodides to silver iodide. When using silver nitrate the relatively few molecules of soluble iodides immediately adjacent the point at which the silver nitrate is added are thus converted at once to silver iodide, but by far the greater portion of the silver nitrate reacts with a portion of the chlorides of the brine to form silver chloride, since the chlorides are present in the brine in appreciably greater quantities than the iodides. By using dilute silver nitrate the silver chloride does not form clots such as will result from the use of a concentrated solution of silver nitrate, and the silver chloride is thus suspended in a finely divided state adapted for penetration to each of the scattered molecules of soluble iodides when the solution is thoroughly mixed, whereby the silver chloride readily reacts with the soluble iodides to form practically insoluble silver iodide in fine suspension in the brine.

The present invention provides for forcing coagulation and rapid settling of such finely suspended silver iodide so that it may be removed by decanting the supernatant brine and without resorting to filtration; and for this purpose I add to the brine containing the suspended silver iodide, a salt of a metal having weak electro-positive properties and adapted to form a colloidal gelatinous hydroxide which will readily coagulate so as to adsorb or entangle the finely suspended particles of silver iodide and cause it to settle along with the hydroxide.

As an example of such metals I may use aluminum or iron, and as a salt of such metals I may employ the chloride, sulfate or nitrate. In practice I have found the ferric salts more efficient than the aluminum salts, and of the ferric salts I have found ferric chloride to give the fastest reaction.

A neutral solution of such a salt is added to the brine containing the finely suspended silver iodide, and by the reaction of the salt with an alkali of the brine the hydroxide of the metal is precipitated. Brines such as oil field waste water are always more or less alkaline and thus provide the necessary alkali for reaction with the metallic salt to precipitate the hydroxide of the metal, but if the brine in which the silver iodide is suspended is not sufficiently alkaline, then an alkaline solution, sodium carbonate for example, is added to the brine.

By employing a solution of a ferric or aluminum salt the hydroxide which is formed is a colloidal substance having great adsorptive powers and readily coagulating to a gelatinous precipitate which will carry down the finely suspended silver iodide and thus settle the latter in a fairly compact mass below the supernatant brine.

In practice I have converted the soluble iodides of oil field waste water to insoluble silver iodide, and to such brine in which the silver iodide is finely suspended, I have added a neutral solution of ferric chloride and have found the brine to be sufficiently alkaline to precipitate the ferric hydroxide so as to coagulate and settle the silver iodide. I have then decanted the supernatant brine, leaving the settled precipitate in a fairly compact mass which I have then flushed out. The iron precipitate may then be dissolved in any suitable acid, with the insoluble silver iodide then filtered out and decomposed in any suitable manner.

Thus for example, the silver iodide when recovered may be decomposed by fusing the silver iodide with sodium or potassium carbonate and then dissolving the fused mass in water so as to liberate the silver and form either sodium or potassium iodide from which the iodine may be precipitated in any well known manner, or the silver iodide may be decomposed by electrolysis, or may be decomposed by agitation in the presence of an excess of a metal such as iron, zinc or copper which will readily replace the silver and form a soluble iodide, ferrous iodide for example, with the ferrous iodide then precipitated and decomposed in any well known manner for recovering the iodine.

While I have specifically described the invention in connection with the recovery of silver iodide from brine in which the silver iodide has been formed by conversion of soluble iodides of the brine to insoluble silver iodide, it will be readily apparent that the process is applicable to the recovery of any finely suspended insoluble iodide such as silver iodide or mercuric iodide from any liquid, the only essential being a sufficiently alkaline solution to precipitate the hydroxide of a metal such as iron or aluminum, and for this purpose a suitable alkali may be added to the solution whenever necessary in order to provide the required alkaline reaction.

It will be further noted that while I have specifically described the process with reference to recovery of silver iodide, the invention is equally applicable to coagulation of any finely suspended and insoluble metallic iodide or bromide, since the salts of these halogens are chemical equivalents in the process which forms the subject matter of this invention.

In practical use of the invention I have found that the relative proportions of the coagulating agent and the finely suspended insoluble halogen salt may be varied throughout a wide range so long as the quantity of the coagulating agent is sufficient to settle all of the finely suspended insoluble salt and is not so excessive as to unnecessarily increase the bulk of the total precipitate; and as an instance of practical proportions I have found that the metal, iron for example, which forms the precipitated hydroxide may vary from about 40% to 100% of the quantity of the silver or other metal which forms the finely suspended insoluble salt.

As an instance of practical use of the invention I have treated 35 liters of brine containing 2.36 gms. of iodine in the form of soluble iodides, with 2.34 gms. of silver in the form of very dilute silver nitrate containing not more than about 10 to 25 mgm. of silver per cu. cm. of water so as to convert all of the soluble iodides to insoluble silver iodide and leave an excess of about 17% of silver. To this brine which then contains the silver iodide in fine suspension, I have added 1 gm. of iron in the form of ferric chloride solution, thereby immediately starting the silver iodide to coagulate and settle, so that within three hours the supernatant liquid has been crystal clear. In practice the various brines which I have treated, such as oil field waste water, have all been naturally sufficiently alkaline to convert all of the ferric chloride to ferric hydroxide, but if the brine were not sufficiently alkaline it would be made so by adding such quantity of an alkali as in practice might be found sufficient to precipitate the ferric hydroxide.

I claim:

1. The method of recovering iodine from brine containing extremely small quantities of soluble iodides and relatively large quantities of soluble chlorides, which comprises adding to the brine a weak solution of a salt of silver containing by weight not more than approximately 25 parts of silver per 1000 parts of water and adapted to convert a portion of the soluble chlorides of the brine to finely divided and suspended silver chloride, diffusing the silver chloride throughout the brine for converting the soluble iodides to finely suspended silver iodide, adding a ferric chloride solution to the brine so as to precipitate ferric hydroxide and thus force coagulation and rapid settling of the silver iodide, the total amount of silver which is added being such as to form the theoretical quantity of silver chloride for converting all of the soluble iodides to silver iodide so as to precipitate substantially all of the iodine as silver iodide and the total amount of iron which is added being from 40% to 100% of said total amount of silver, decanting the supernatant brine, flushing out the settled precipitate, dissolving the iron precipitate, and filtering out and decomposing the silver iodide.

2. The method of recovering iodine from brine containing extremely small quantities of soluble iodides, which comprises treating the brine with silver chloride for converting the soluble iodides to finely suspended silver iodide, adding a ferric chloride solution to the brine so as to precipitate ferric hydroxide and thus force coagulation and rapid settling of the silver iodide, decanting the supernatant brine, separating the iron from the settled precipitate, and decomposing the silver iodide.

3. The method of recovering iodine from brine containing extremely small quantities of soluble iodides and relatively large quantities of soluble chlorides, which comprises adding to the brine a salt of silver which is adapted to convert a portion of the soluble chlorides of the brine to finely divided and suspended silver chloride, diffusing the silver chloride throughout the brine for converting the soluble iodides to finely suspended silver iodide, adding a ferric chloride solution to the brine so as to precipitate ferric hydroxide and thus force coagulation and rapid settling of the silver iodide, decanting the supernatant brine, and decomposing the silver iodide.

4. The method of recovering iodine from oil field waste water containing relatively large quantities of soluble chlorides and extremely small quantities of soluble iodides in the proportion of only a fractional part of a gram of iodine per liter of solution, which comprises adding to the brine a salt of silver which is adapted to convert a portion of the soluble chlorides to silver chloride, diffusing the silver chloride for converting the soluble iodides to finely suspended silver iodide, adding a ferric chloride solution to the brine so as to precipitate ferric hydroxide and thus force coagulation and rapid settling of the silver iodide, the total amount of silver which is added being such as to form the theoretical quantity of silver chloride for converting all of the soluble iodides to silver iodide so as to precipitate substantially all of the iodine as silver iodide and the total amount of iron which is added being from 40% to 100% of said total amount of silver, decanting the supernatant brine, and decomposing the silver iodide.

5. The method of recovering iodine from an alkaline solution containing finely suspended insoluble silver iodide, which comprises adding a ferric chloride solution so as to precipitate ferric hydroxide and thus force coagulation and rapid settling of the silver iodide, decanting the supernatant brine, flushing out the settled precipitate, dissolving the iron precipitate, and filtering out and decomposing the silver iodide.

6. The method of recovering iodine from alkaline oil field waste water containing extremely small quantities of soluble iodides, which comprises adding to the brine a salt of silver for converting the soluble iodides to finely suspended insoluble silver iodide, adding a ferric chloride solution to the alkaline brine so as to precipitate ferric hydroxide and thus force coagulation and rapid settling of the silver iodide, decanting the supernatant brine so as to leave only the settled precipitate, dissolving the iron precipitate, and filtering out and decomposing the silver iodide.

7. The method of recovering iodine from an alkaline brine containing extremely small quantities of soluble iodides, which comprises treating the brine with a silver salt to precipitate the soluble iodides as finely divided insoluble silver iodide, adding a solution of a salt selected from the group consisting of the chlorides, sulphates and nitrates of iron and aluminum to precipitate the corresponding metal hydroxide and thus cause coagulation and rapid settling of the silver iodide, and separating the settled precipitate from the brine.

8. The method of recovering iodine from an alkaline brine containing extremely small quantities of soluble iodides, which comprises treating the brine with a silver salt to precipitate the soluble iodides as finely divided insoluble silver iodide, adding a ferric chloride solution to precipitate ferric hydroxide and thus cause coagulation and rapid settling of the silver iodide, and separating the settled precipitate from the supernatant brine.

9. The method of recovering iodine from an alkaline brine containing extremely small quantities of soluble iodides, which comprises treating the brine with a silver salt to precipitate the soluble iodides as finely divided insoluble silver iodide, adding a ferric chloride solution to precipitate ferric hydroxide and thus cause coagulation and rapid settling of the silver iodide, decanting the supernatant brine from the settled precipitate and recovering silver iodide from the latter.

In testimony whereof I have affixed my signature.

CHARLES W. GIRVIN.